United States Patent [19]

Ichida

[11] Patent Number: 5,318,365
[45] Date of Patent: Jun. 7, 1994

[54] ROLLING GUIDE UNIT

[75] Inventor: Tomohiro Ichida, Tokyo, Japan

[73] Assignee: Nippon Gasket Co., Ltd., Minato, Japan

[21] Appl. No.: 40,198

[22] Filed: Apr. 1, 1993

[30] Foreign Application Priority Data

Apr. 2, 1992 [JP] Japan .................................. 4-108384

[51] Int. Cl.$^5$ ...................... F16C 29/06; F16C 31/00; F16C 19/00
[52] U.S. Cl. ......................................... 384/45; 384/7; 384/48; 384/91
[58] Field of Search ..................... 384/7, 9, 25, 43-45, 384/47-50, 53, 91, 619

[56] References Cited

U.S. PATENT DOCUMENTS 4,384,859  5/1983  Teramachi .......................... 384/45
4,598,956  7/1986  Teramachi .......................... 384/45

FOREIGN PATENT DOCUMENTS 112021  4/1989  Japan .
423233  2/1992  Japan .

Primary Examiner—Thomas R. Hannon
Attorney, Agent, or Firm—Browdy and Neimark

[57] ABSTRACT

In this rolling guide unit, a slider is provided on a track rail so that the slider can be moved slidingly in a linear direction, and a circular bore is formed in a casing constituting the slider. A cross-sectionally V-shaped outer annular raceway surface is formed on the circumferential surface of the circular bore, and a rotary body consisting of lower and upper rotary bodies is fixed rotatably in the same circular bore. The casing constitutes a common part having both a function of making a linear movement and a function of making a rotational movement. This enables the height of the rolling guide unit to be reduced to as great an extent as possible, and an accumulated error due to an assembling operation to be minimized, so that a highly accurate guide machine can be provided.

3 Claims, 3 Drawing Sheets

ROLLING GUIDE UNIT

BACKGROUND OF THE INVENTION

1. Field of the Invention:

This invention relates to a rolling guide unit adapted to be used for the sliding and rotary portions of a machine tool, various kinds of precision machining apparatuses and a testing apparatus.

2. Description of the Prior Art:

A conventional linear motion rolling guide unit consists of a track rail having raceway grooves in the longitudinally extending both side surfaces thereof, a slider saddled on the track rail and having raceway grooves therein, and a plurality of rolling elements adapted to roll between the opposed raceway grooves, and an apparatus of comparatively large weight is placed on the slider, the rolling guide unit being adapted to guide highly precise longitudinal movements of the apparatus over a comparatively long distance (refer to Japanese Patent Laid-Open No. 112021/1989).

FIG. 4 is a perspective view of an example of a conventional linear motion rolling guide unit. As shown in FIG. 4, the linear motion rolling guide unit has two rows of parallel-extending track rails 2 fixed on a bed 20, a plurality of sliders 1 moving slidingly on each track rail 2 in a track rail-saddling state, and a slide table 4 fixed on four sliders 1, one of various kinds of apparatuses placed on the slide table 4 being moved linearly in the longitudinal direction of an arrow G. In this linear motion rolling guide unit, the raceway grooves 5 are formed in the longitudinally extending both side surfaces 21 of the track rails 2, and the slider 1 is mounted on the track rails 2 so as to be slidable thereon in a rail-saddling state (refer to, for example, Japanese Utility Model Laid-Open No. 23233/1992).

The slider 1 described above is formed as shown in, for example, FIG. 5. FIG. 5 is a perspective view showing an example of a conventional linear motion rolling guide unit. The linear motion rolling guide unit consists mainly of a track rail 2 having raceway grooves 5 in the longitudinally extending both side surfaces 21 thereof, and a slider 1 adapted to be moved linearly on the track rail 2. The slider 1 is placed in a saddled state on the track rail 2, and adapted to be slided freely via a plurality of rolling elements 13 circulating along the raceway grooves 5 in the track rail 2. The slider 1 has a casing 3 provided with raceway grooves 54 in the portions thereof which are opposed to the raceway grooves 5, a plurality of rolling elements 13 fitted between the opposed raceway grooves 5, 54 and consisting of a plurality of circulatingly rollable balls, and end caps 6 attached to both of the longitudinal end portions of the casing 3. The end caps 6 are provided with side seals 50 which attain the sealing of the contact portions of the track rail 2 and slider 1, and a grease nipple 55 for supplying a lubricant to slide surfaces between the track rail 2 and slider 1. In order to prevent the rolling elements 13 from falling from the casing 3, retainer straps 51 are fixed to the casing 3 so as to surround the rolling elements 13. Moreover, in order to reliable prevent the rolling elements 13 from falling from the casing 3, lower seals 53 are fixed to the casing 3 so as to seal the casing 3, the longitudinally extending both side surfaces 21 of the track rail 2 and the lower surface of the casing 3.

The rolling elements 13 in a load region which roll between a raceway groove 5 in the track rail 2 and that 54 in the casing 3 are introduced into a switchover passage (not shown) formed in an end cap 6, and then moved into a return passage 52 formed in the upper portion of the casing 3 and extending in parallel with the raceway groove 54, whereby the rolling elements 13 are circulated limitlessly in the endless circulating passage. Thus, owing to the rolling of the loaded rolling elements 13 positioned between the raceway grooves 54 formed in the slider 1 and those 5 formed in the track rail 2, the slider 1 can be moved linearly on the track rail 2 (refer to, for example, Japanese Patent Application No. 326317/1991).

There is a publication disclosing a conventional rotary motion guide unit shown in FIG. 6 in which a bearing is provided. In this rotary motion rolling guide unit, a bearing 28 formed by inserting cylindrical rollers 32 between an inner race 27, which has a V-shaped raceway surface for making a relative movement of the rollers 32 thereon, and outer races 16, 17 is incorporated, and a rotary body 24 is fixed rotatably to a base 23. In the rotary motion rolling guide unit, the inner race 27 is fixed to the outer circumferential surface 22 of a cylindrical shaft portion 19 of the base 23 with a fixing means, such as a bolt and a clamp. The rotary body 24 is adapted to be rotated relatively to the base 23, and the upper and lower outer races 16, 17 are fixed to the inner circumferential surface 25 of a cylindrical portion 18 of the rotary body 24 with a fixing means, such as a bolt and a clamp. The rolling guide unit is formed by arranging a plurality of cylindrical rollers 32 in an alternately crossing manner between the inner and outer races 27, 16, 17. The inner race 27 is provided on its outer circumferential side with a V-shaped raceway surface 29, and the upper and lower outer races 16, 17 on their inner circumferential sides with raceway surfaces 30, 31 respectively, by which one V-shaped raceway surface is formed.

There is a publication disclosing a linear motion rolling guide unit as a conventional rolling guide unit, on which an apparatus of comparatively large weight is placed as shown in FIG. 5, the guide unit being adapted to guide a linear longitudinal movement of the apparatus over a comparatively long distance. There is also a publication disclosing a rotary motion rolling guide unit in which a bearing 28 is incorporated between a base 23 and a rotary body 24 as shown in FIG. 6, with the rotary body 24 fixed to the base 23 rotatably so that the rotary body 24 can be moved relatively to the base 23. When it is necessary that both a linear movement and a rotational movement be made in a rolling guide unit in accordance with the conventional techniques, the above-mentioned linear motion rolling guide unit and rotary motion rolling guide unit are combined so that both of these movement can be made.

However, a rolling guide unit having construction which enables both a linear movement and a rotational movement to be made simultaneously has not been developed up to the present time. In a conventional structure in which a linear motion rolling guide unit and a rotary motion rolling guide unit are combined, the dimensions of the guide unit increases to a high level, and the height thereof becomes excessively large, or an accumulated error due to the guide unit-combining operation increases. Thus, it is impossible at present to provide a highly accurate rolling guide unit.

SUMMARY OF THE INVENTION

A primary object of the present invention is to solve these problems and provide a rolling guide unit which has a miniaturized structure in which a part making a rotational movement is incorporated into a casing making a linear movement, whereby both linear and rotational movements can be made simultaneously, and which enables the height of the guide unit to be reduced to as great an extent as possible, an accumulated error due to an assembling operation to be minimized, and highly accurate rotational and linear movement to be made.

Another object of the present invention is to provide a rolling guide unit comprising a track rail provided with first raceway grooves in the longitudinally both side surfaces thereof; a slider saddled on the track rail and capable of being linearly moved, and consisting of a casing provided with second raceway grooves in the portions thereof which are opposed to the first raceway grooves, end caps fixed to both of the longitudinal end portions of the casing, side seals disposed in contact with the end caps, and first rolling elements circulatingly rollable between the opposed first and second raceway grooves; a circular bore formed in the casing and provided in the inner circumferential side thereof with outer upper and lower raceway surfaces extending so as to form a cross-sectionally V-shaped recess; a lower rotary body fitted rotatably in the circular bore in the casing and provided with an inner lower raceway surface opposed with respect to the circumferential direction thereof to the outer lower raceway surface of the circular bore; an upper rotary body placed fixedly on the lower rotary body, fitted rotatably in the circular bore in the casing and provided with an inner upper raceway opposed with respect to the circumferential direction thereof to the outer upper raceway surface of the circular bore; and second rolling elements adapted to roll between the inner upper and lower raceway surfaces and outer lower and upper raceway surfaces.

In this rolling guide unit, the second rolling elements consist of first cylindrical rollers rolling between the inner upper raceway surface and outer lower raceway surface, and second cylindrical rollers rolling between the inner lower raceway surface and outer upper raceway surface, and the first and second cylindrical rollers are arranged in an alternately crossing state.

In this rolling guide unit, a clearance between the outer circumferential surface of the upper rotary body and the inner circumferential surface of the through bore in the casing is provided therein with a seal member for preventing the entry of extraneous matter, such as water and dust.

Since this rolling guide unit is provided with a circular bore in the slider which is adapted to be moved slidingly on the upper surface of the track rail, and lower and upper rotary bodies fitted in the circular bore via rolling elements, the slider serves as a common part having both a function of making a sliding movement, i.e. a linear movement and a function of making a pivotal movement. This enables the height of the rolling guide unit to be reduced to as great an extent as possible, the number of parts to be reduced and an accumulated error due to an assembling operation to be minimized, whereby a highly accurate guide machine can be provided.

In this rolling guide unit, the slider constitutes one part making a linear movement, and a part for making a rotational movement can be incorporated in the slider. Consequently, when this rolling guide unit is used, it does not require an operation for combining a linear motion rolling guide unit with a rotary motion rolling guide unit unlike a conventional rolling guide unit, and the number of parts to be assembled and an accumulated error due to an assembling operation can be minimized, so that a highly accurate rolling guide unit can be provided.

Since the slider is provided with rotary bodies having a function of making a linear movement and a function of making a rotational movement, the height of the guide unit can be reduced to as great an extent as possible, whereby the guide unit can be formed compactly.

The above and other objects as well as advantageous features of the invention will become apparent from the following description of the preferred embodiments taken in conjunction with the accompanying drawings.

DESCRIPTION OF THE PREFERRED EMBODIMENTS

Figure 1:
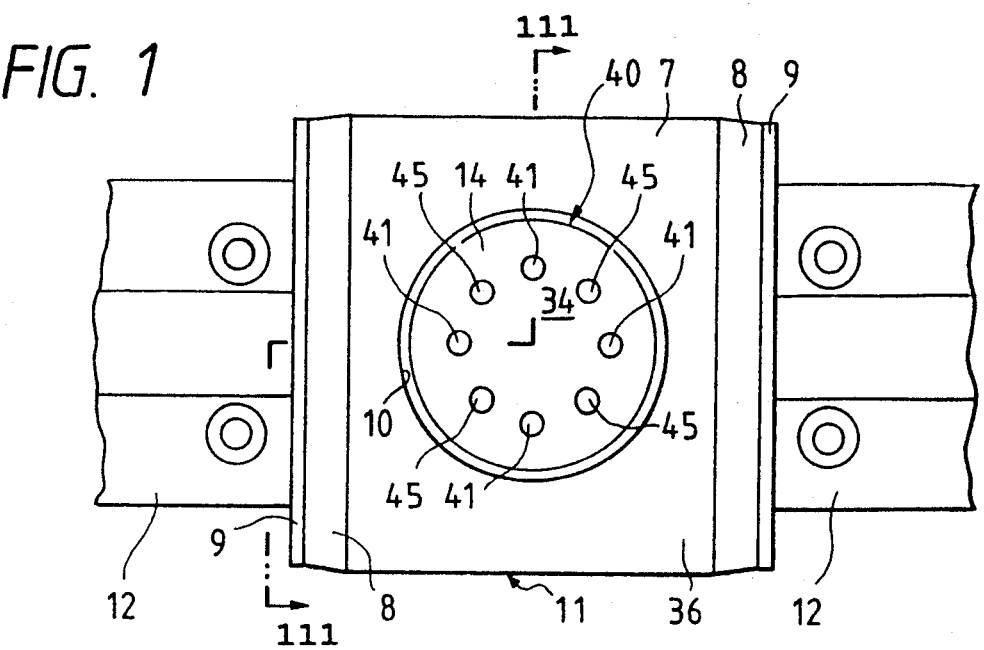
FIG. 1 is a plan view of an embodiment of the rolling guide unit according to the present invention.
Figure 2:
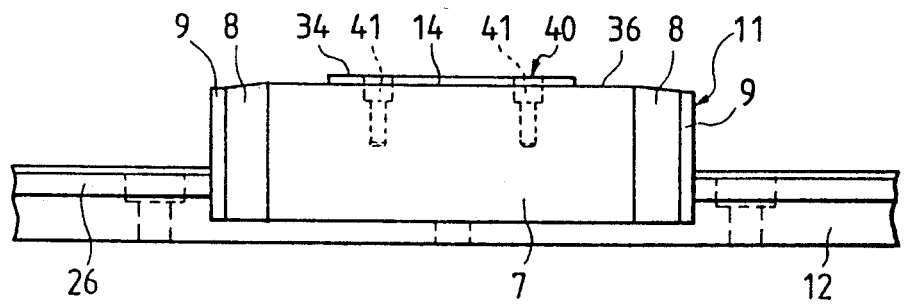
FIG. 2 is a side elevation of the rolling guide unit of FIG. 1.
Figure 3:
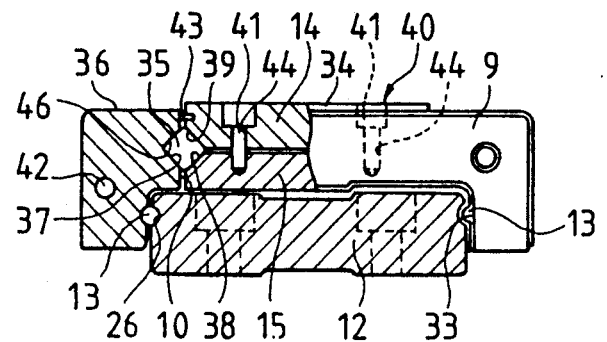
FIG. 3 is a partially sectioned end view taken along the line III—III in FIG. 1.
Figure 4:
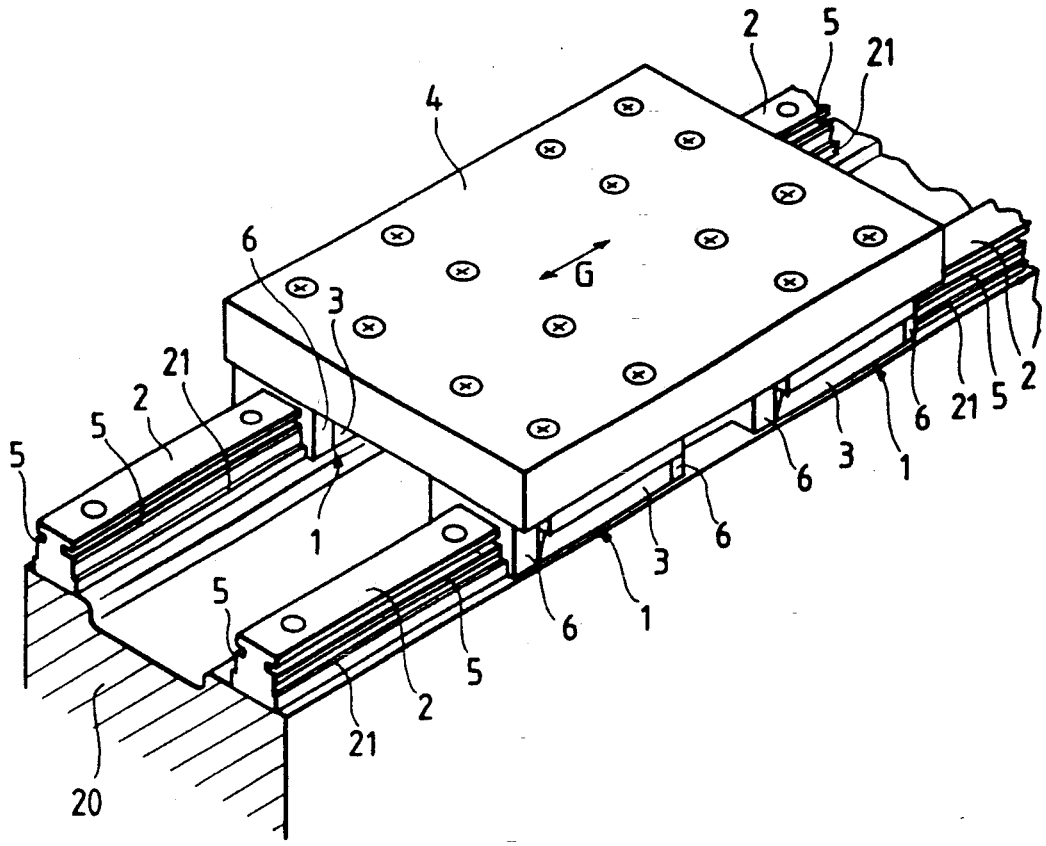
FIG. 4 is a perspective view of an example of a conventional linear motion rolling guide unit.

The embodiments of the rolling guide unit according to the present invention will now be described with reference to the drawings. First, an embodiment of the rolling guide unit according to the present invention will be described with reference to FIGS. 1, 2 and 3.

This rolling guide unit has a track rail 12 fixed on a bed or a base, a slider 11 saddled slidably on the track rail 12, a lower rotary body 15 fixed rotatably to the slider 11, and an upper rotary body 14 fixed in a horizontally placed state on the lower rotary body 15. The track rail 12 is provided with raceway grooves 26 in both of the longitudinally extending side surfaces thereof. The slider 11 has a casing 7, end caps 8 attached to both end surfaces, with respect to its sliding direction, of the casing 7, and side seals 9 fixed to the end surfaces of the end caps 8. The casing 7 is further provided with raceway grooves 33, which are opposed to the raceway grooves 26 in the track rail 12 and extend in the sliding direction of the casing 7. A plurality of rolling elements 13 consisting of balls or cylindrical rollers are inserted rollably in raceways formed between the raceway grooves 26 in the track rail 12 and those 33 in the casing 7.

Figure 5:
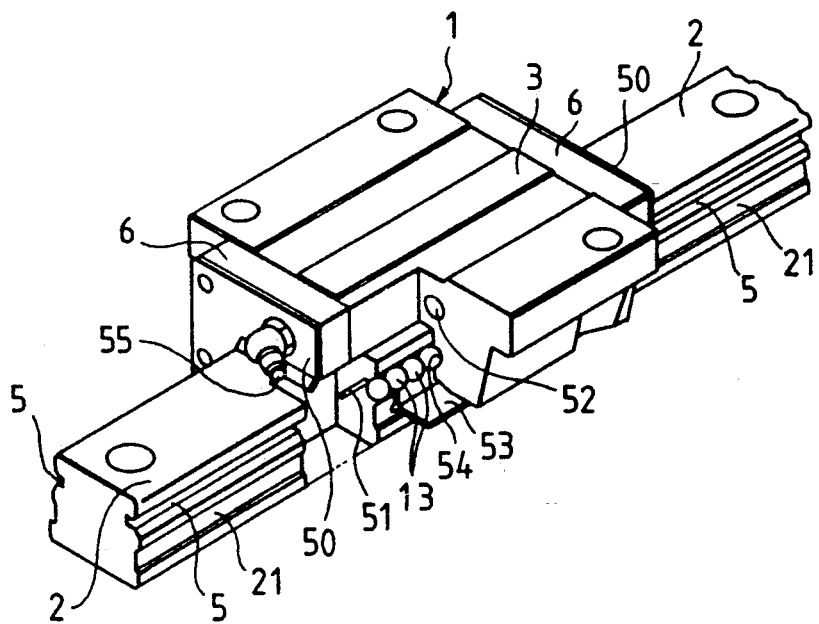
FIG. 5 is a perspective view of an example of a linear motion rolling guide unit.
Figure 6:
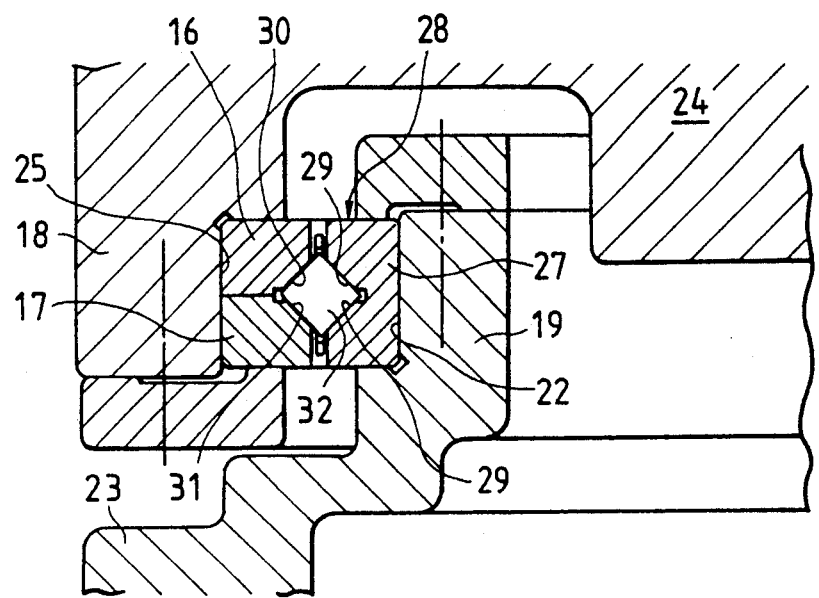
FIG. 6 is a sectional view of an example of a conventional rotary motion rolling guide unit with a bearing incorporated therein.

Lower seal members (designated by a reference numeral 53 in FIG. 5) for effecting the sealing of the portions between the track rail 12 and casing 7, and retainer straps (designated by a reference numeral 51 in FIG. 5) for preventing the rolling elements 13 from falling from the casing 7 are fixed to the casing 7 so as to surround the rolling elements 13. Side seals 9 for effecting the sealing of the portions between the track rail 12 and slider 1, and grease nipples (designated by a reference numeral 55 in FIG. 5) for supplying a lubricant to the slide surfaces between the track rail 12 and slider 1 are provided on the end caps 8. The end caps 8 are attached to both end surfaces of the casing 7 by inserting screws into a plurality of holes made therein, and provided in the lower surfaces thereof with recesses through which the track rail 12 is inserted with the end caps saddled thereon, switchway passages (not shown) for changing the direction of movements of the rolling elements 13 and circulating the same being formed at both sides of the end caps 8.

In this rolling guide unit, the casing 7 for the slider 11 is provided with a circular bore 10 in the central portion thereof. This circular bore 10 is provided on its inner circumferential surface with outer upper and lower raceway surfaces 46, 37 extending so as to form a cross-sectionally V-shaped recess. The lower rotary body 15 provided with an inner lower raceway surface 38 opposed with respect to the circumferential direction thereof to the outer lower raceway surface 37 is fitted rotatably in the circular bore 10 in the casing 7 constituting the slider. An upper rotary body 14 fixed in a horizontally placed state on the lower rotary body 15 and provided with inner upper raceway surface 39 opposed with respect to the circumferential direction thereof to the outer upper raceway surface 46 is also fitted rotatably in the circular bore 10 in the casing 7. Namely, a rotary body unit 40 consisting of the upper and lower rotary bodies 14, 15 is fixed rotatably in the casing 7, and the inner lower and upper raceway surfaces 38, 39 are positioned so as to form a cross-sectionally V-shaped recess. The upper rotary body 14 is provided with a plurality of holes 44, through which screws 41 are driven into the lower rotary body 15, whereby the upper and lower rotary bodies 14, 15 are fixed to each other to form the rotary body unit 40. The upper and lower rotary bodies 14, 15 can, of course, be fixed to each other not only with the screws 41 but also with some other kind of fixing means.

An object loaded on the upper rotary body 14 is fixed thereon by driving fixing means, such as hexagon socket head cap screws, common screws or rivets into a suitable number of female screws 45 provided in the upper rotary body 14. The female screws 45 may, of course, be formed so as to extend into both the upper rotary body 14 and lower rotary body 15.

A plurality of rolling elements 35 consisting of cylindrical rollers or balls are arranged in an alternately crossing manner in an annular raceway formed by the outer upper and lower raceway surfaces 46, 37 formed in the casing 7, the inner lower raceway surface 38 of the lower rotary body 15 and the inner upper raceway surface 39 of the upper rotary body 14, and they are adapted to roll in this annular raceway. For example, when the rollers 35 consist of cylindrical rollers, they are composed of first cylindrical rollers adapted to roll between the inner upper raceway surface 39 and outer lower raceway surface 37, and second cylindrical rollers adapted to roll between the inner lower raceway surface 38 and outer upper raceway surface 46, the first and second cylindrical rollers being arranged in an alternately crossing state.

In order to prevent water and dust from entering a clearance between the upper surface 36 of the casing 7 and that 34 of the upper rotary body 14, a seal member 43 is provided in the clearance.

Since the rotary body unit 40 in this rolling guide unit is divided into the upper and lower rotary units 14, 15, the rolling elements 35 can be inserted between the inner lower raceway surface 38 and the outer upper raceway surface 46 of the circular bore 10 and the inner lower raceway surface 38 of the lower rotary body 15 after the lower rotary body 15 has been fitted in the circular bore 10 in the casing 7. The upper rotary body 14 is then fitted in the circular bore 10 in the casing 7, and the upper and lower rotary bodies 14, 15 are combined firmly with screws 41, whereby the rotary body unit 40 can be set rotatably in the circular bore 10 in the casing 7.

In this rolling guide unit, the rolling elements 13 in a load region which roll on the raceway grooves 26 in the track rail 12 and those 33 in the casing 7 are introduced into the switchway passages formed in the end caps 8, and then moved to return passages 42 formed in parallel with the raceway grooves 33 in the casing 7, whereby the rolling elements 13 are circulated limitlessly in the endless circulating passage. Accordingly, the slider 11 which is set in a saddled state on the track rail 12 can be moved slidingly and reciprocatingly in the linear direction in an unrestricted manner via the rolling elements 13 rolling circulatingly along the raceway grooves 26 in the track rail 12.

The casing 7 is provided at the central portion thereof with the circular bore 10, on the circumferential side of which a cross-sectionally V-shaped outer annular raceway surface constituting an endless raceway and defined by the outer upper raceway surface 46 and outer lower raceway surface 37 is formed. In other words, the circular bore 10 in the casing 7 constitutes a raceway surface of an outer race of a conventional bearing. The circular bore 10 in the casing 7 is provided therein with the rotary body unit 40 consisting of the upper and lower rotary bodies 14, 15 and fixed rotatably therein. Moreover, the upper rotary body 14 is provided with the inner upper raceway surface 39, and the lower rotary body 15 the inner lower raceway surface 38, these inner upper and lower raceway surfaces 39, 38 forming a cross-sectionally V-shaped inner annular raceway surface opposed to the outer annular raceway surface. In other words, the upper and lower rotary bodies 14, 15 constitute an inner race of a conventional bearing. The annular raceway consisting of the inner and outer annular raceway surfaces is provided with rolling element 35 consisting of cylindrical rollers or balls. Therefore, the rotary body unit 40 consisting of the upper and lower rotary bodies 14, 15 can be rotated relatively to the casing 7.

In this rolling guide unit, the casing 7 constitutes one part which makes a sliding movement on the track rail 12, owing to the circular bore 10 formed therein, and also the other part which makes a rotational movement, owing to the circular bore 10 formed so as to serve as an outer race of a bearing. Accordingly, the casing 7 constitutes a part used both as a part making a linear movement and a part making a rotational movement. This enables the rolling guide unit to make both a linear movement and a rotational movement simultaneously, the dimensions thereof to be minimized, the height thereof to be reduced to as great an extent as possible, an accumulated error due to an assembling operation to be reduced, and the rotational and linear movements thereof to be made with a high accuracy.

What is claimed is:

1. A rolling guide unit comprising:

a track rail provided with first raceway grooves in the longitudinally extending both side surfaces thereof, a slider saddled on said track rail and capable of being linearly moved, and consisting of a casing provided with second raceway grooves in the portions thereof which are opposed to said first raceway grooves, end caps fixed to both of the longitudinal end portions of said casing, side seals disposed in contact with said end caps, and first rolling elements circulatingly rollable between said opposed first and second raceway grooves, a circular bore formed in said casing and provided on the inner circumferential surface thereof with an outer upper raceway surface and an outer lower raceway surface adjacent to said outer upper raceway surface, a lower rotary body fitted rotatably in said circular bore in said casing and provided with an inner lower raceway surface opposed with respect to the circumferential direction thereof to said outer lower raceway surface of said circular bore, an upper rotary body placed fixedly on said lower rotary body, fitted rotatably in said circular bore in said casing and provided with an inner upper raceway surface opposed with respect to the circumferential direction thereof to said outer upper raceway surface of said circular bore, and second rolling elements adapted to roll between said inner upper and lower raceway surfaces and said outer lower and upper raceway surfaces.

2. A rolling guide unit according to claim 1, wherein said outer upper and lower raceway surfaces formed in said circular bore in said casing form a cross-sectionally V-shaped recess, and said second rolling elements consist of first cylindrical rollers rolling between said inner upper raceway surface and said outer lower raceway surface, and second cylindrical rollers rolling between said inner lower raceway surface and said outer upper raceway surface, said first and second cylindrical rollers being arranged in an alternately crossing state.

3. A rolling guide unit according to claim 1, wherein a clearance formed between the outer circumferential surface of said upper rotary body and the inner circumferential surface of said through bore in said casing is provided therein with a seal member for preventing the entry of extraneous matter.

* * * * *